United States Patent [19]

Sargent

[11] Patent Number: 5,031,249
[45] Date of Patent: Jul. 16, 1991

[54] UNIVERSAL RECREATIONAL VEHICLE TOILET SYSTEM WITH REMOVABLE HOLDING TANK

[75] Inventor: Charles L. Sargent, Ann Arbor, Mich.

[73] Assignee: Thetford Corporation, Ann Arbor, Mich.

[21] Appl. No.: 371,389

[22] Filed: Jun. 23, 1989

[51] Int. Cl.$^5$ .......................... E03D 1/00; E03D 1/34
[52] U.S. Cl. ............................................ 4/321; 4/458; 4/428; 4/378
[58] Field of Search ................... 4/321, 323, 458, 479, 4/483, 664, 665, 300, 428, 460, 663, DIG. 2, 252 R; 285/56, 58, 59

[56] References Cited

U.S. PATENT DOCUMENTS

| | | |
|---|---|---|
| 27,833 | 12/1873 | Carmichael et al. .................. 4/321 |
| 60,153 | 12/1866 | Diven ................................... 285/56 |
| 1,042,061 | 10/1912 | Webb .................................... 4/664 |
| 1,061,632 | 5/1913 | Podolsky ............................. 285/58 |
| 1,859,859 | 5/1932 | Zook ................................. 4/DIG. 2 |
| 2,758,316 | 8/1956 | Schwartz et al. ................... 4/252 R |
| 3,775,780 | 12/1973 | McEwen ............................... 4/420 |
| 3,858,249 | 1/1975 | Howard ................................ 4/323 |
| 4,242,765 | 1/1981 | Russell ................................. 4/321 |
| 4,313,233 | 2/1982 | Roberts ................................ 4/321 |
| 4,504,983 | 3/1985 | Goodyer ............................... 4/321 |
| 4,769,860 | 9/1988 | Sargent ................................. 4/321 |
| 4,776,631 | 10/1988 | Sargent et al. ........................ 4/300 |
| 4,785,483 | 11/1988 | Wise .................................... 4/483 |
| 4,892,349 | 1/1990 | Sargent ................................. 4/321 |
| 4,908,885 | 3/1990 | Antos ................................... 4/321 |

FOREIGN PATENT DOCUMENTS 83645 10/1981 Italy ........................................ 4/321

OTHER PUBLICATIONS

Thetford Cassette Porta-Potti.
Thetford Corp. Product information.

Primary Examiner—Henry J. Recla
Assistant Examiner—Keith Kupferschmid
Attorney, Agent, or Firm—Harness, Dickey & Pierce

[57] ABSTRACT

A universal recreational vehicle toilet system with a removable waste holding tank is provided to enable the recreational vehicle manufacturer to have wide latitude in the positioning of the toilet within a recreational vehicle. The toilet system includes an upper section containing the toilet bowl and a lower section forming a base upon which the bowl section is supported in spaced relation above the recreational vehicle floor. A holding tank is partially or fully inserted in the base section and coupled to the toilet bowl for receiving waste therefrom. The holding tank is removable through an opening in the sidewall of the recreational vehicle for disposal of waste. The upper section and the base section of the universal toilet system are configured so that the upper section can be mounted on the base section at any of several angles relative to the base section providing the recreational vehicle manufacturer the ability to place the toilet in a recreational vehicle at several locations without need for a separate toilet system for each location. To further provide flexibility, the toilet is flushed by a control that can be mounted to a wall in the recreational vehicle remotely from bowl and base sections and connected to the bowl and base sections by an electrical wire and a cable respectively.

14 Claims, 7 Drawing Sheets

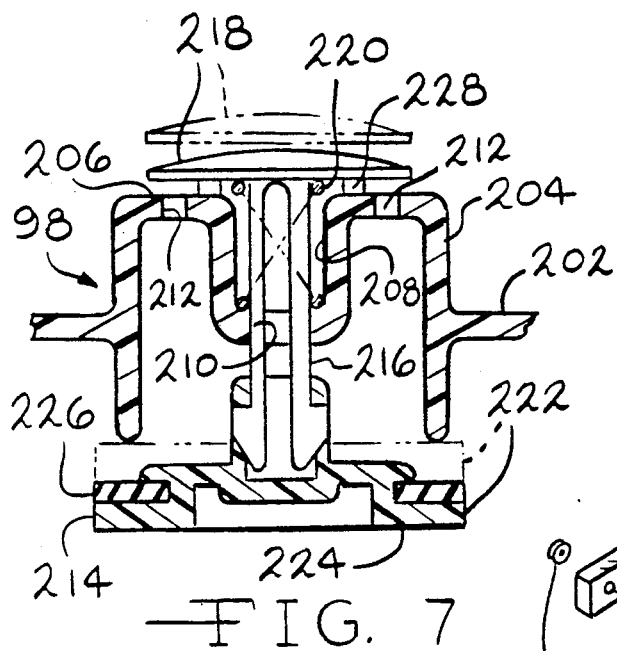
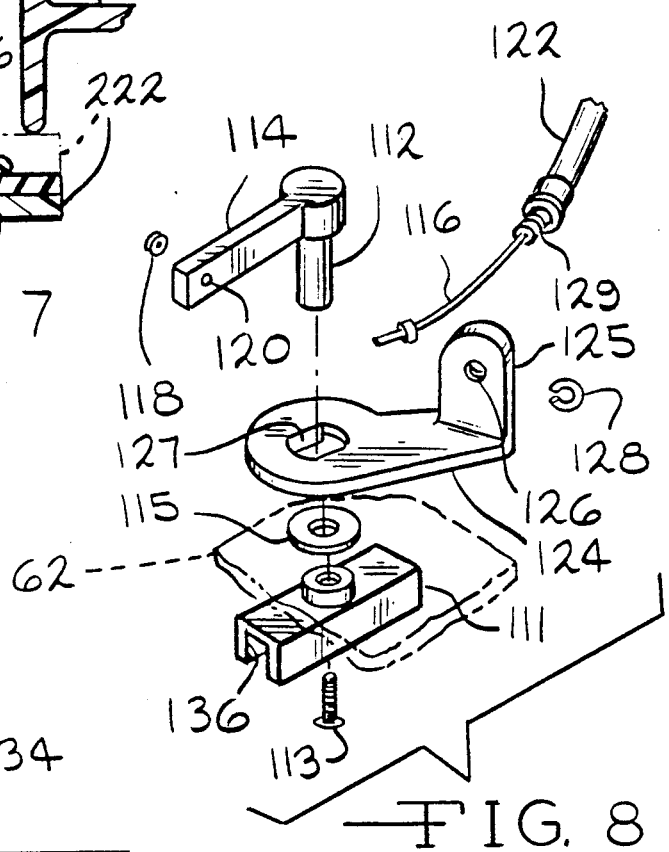
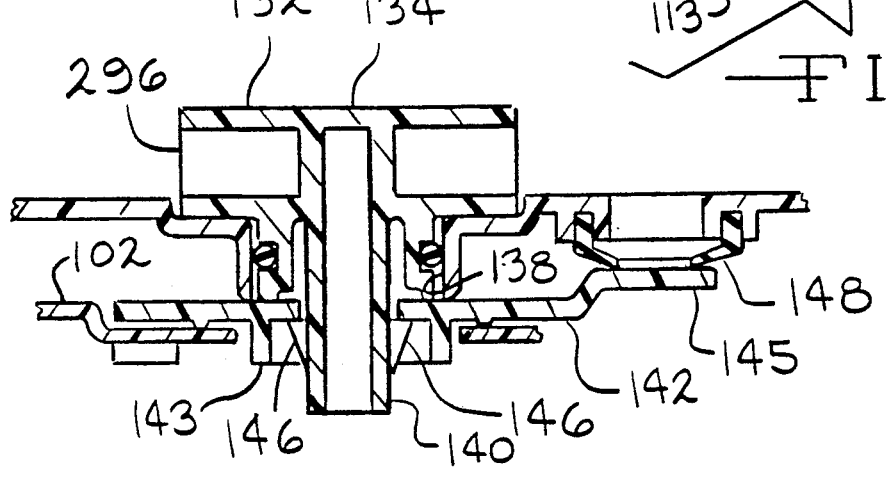

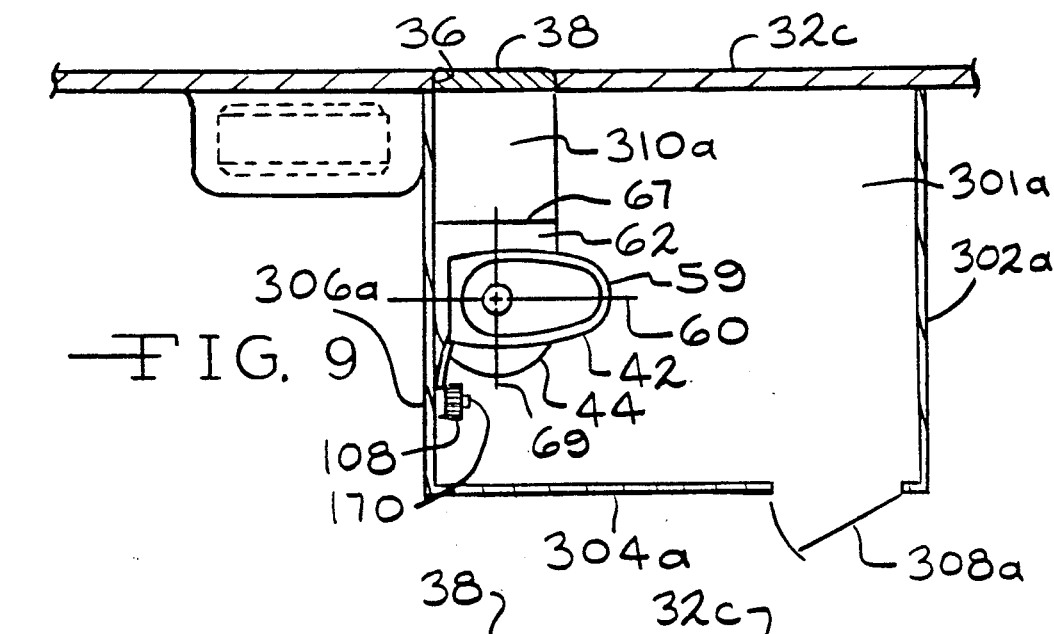
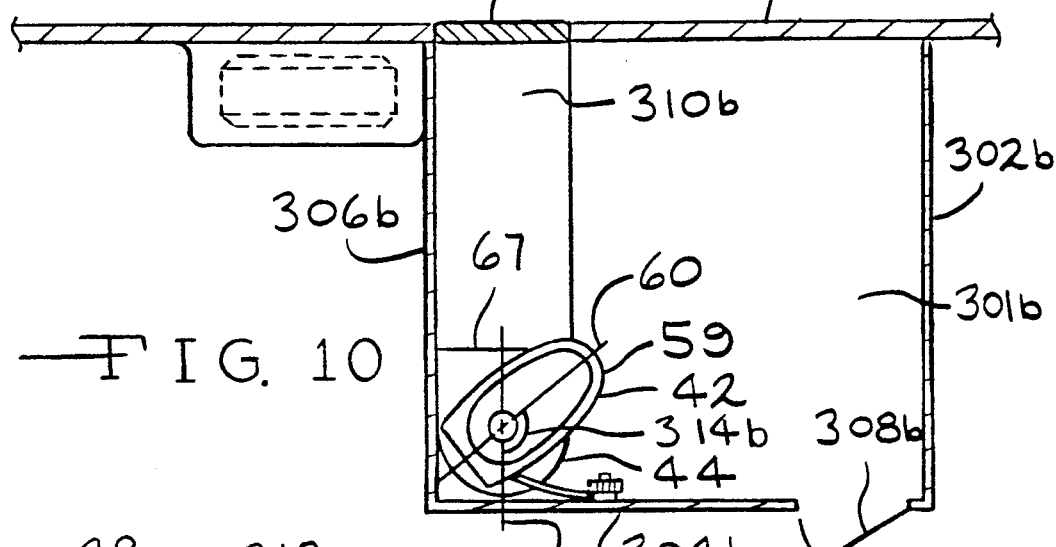
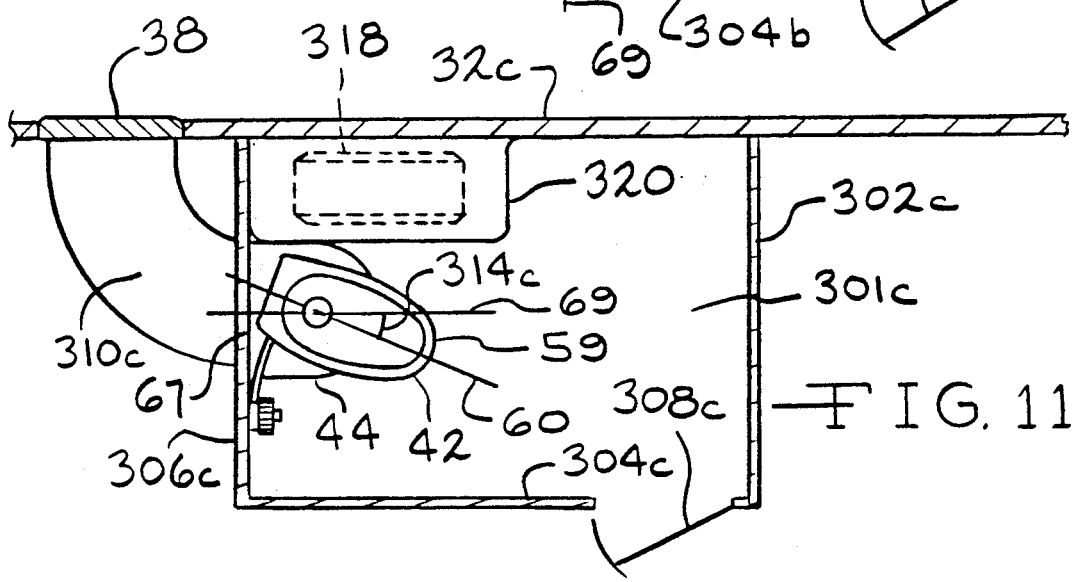

5,031,249

UNIVERSAL RECREATIONAL VEHICLE TOILET SYSTEM WITH REMOVABLE HOLDING TANK

BACKGROUND AND SUMMARY OF THE INVENTION

This invention relates to toilets for use in recreational vehicles such as motor homes and travel trailers and is particularly related to a universal toilet system for recreational vehicles that is adaptable to be installation in a wide variety of locations within the recreational vehicle.

Toilets for recreational vehicles (RV) are generally manufactured by a third party and supplied to the RV manufacturer for installation into a vehicle. In the past, each toilet has been designed for use in a particular location within a recreational vehicle, such as a bench along one side of a bathroom or in a corner of the bathroom, etc. Because vehicle manufacturers typically provide a number of RV models, a number of different toilets are required to meet the manufacturer's needs. The RV manufacturer is thus required to inventory a number of different toilets to accommodate the various RV models. Accordingly, it is an object of the present invention to provide a single toilet system which is configured to be used in a variety of locations within a RV at the desire of the RV manufacturer. It is a further objective of the invention to increase the manufacturer's flexibility in the interior design of the vehicle The universal recreational vehicle toilet system of the present invention includes an upper bowl section containing a toilet bowl with a bottom outlet and a lower base section upon which the bowl section is mounted above the RV floor. A removable waste holding tank is inserted into the base section, or at least a portion of the tank is inserted into the base section below the bowl outlet and contains a disconnectable fluid coupling with the bowl outlet for receiving waste therefrom. The base section, either individually or in cooperation with a wall structure within the RV body forms a stowage compartment in which the holding tank is stowed in fluid connection with the bowl outlet. The tank and any waste odors or spillage are isolated from the RV body interior living space. The tank is removable from the stowage compartment through an opening in the RV sidewall for disposal of the waste therefrom.

The bowl section and the base section of the toilet system are constructed in such a manner that the front of the bowl section can be rotated about an upright axis relative to the base section to adapt the installed position of the bowl section in the RV to a desired position. This enables the RV manufacturer to position the base in a variety of locations within the recreational vehicle and further enables the bowl section to be positioned in a variety of orientations relative to the base.

The universal toilet system further allows for different sized and shaped tanks to accommodate different applications The tank has an inlet opening in the top wall through which the waste enters the tank. A blade valve closes the opening when the toilet is not in use.

The bowl is flushed by water provided to the toilet from a pressurized water source in the RV. The flush mechanism of the toilet includes an electrically actuated valve to control the flow of flush water.

The control for the flush valve and the tank blade valve are remotely mounted to a wall within the RV and connected to the base and bowl section via flexible cable and electrical wire respectively. The RV manufacturer is free to mount the control where desired, regardless of the orientation of the bowl section upon the base section. A coupling mechanism between the base section and tank operatively connects the tank blade valve to the valve actuator cable. The coupling mechanism includes an actuating member mounted to the base section and an actuated member mounted to the tank which automatically couple as the tank is moved into the stowed position in the base section.

Further objects, features and advantages of the invention will become apparent from a consideration of the following description and the appended claims when taken in connection with the accompanying drawings.

BRIEF DESCRIPTION OF THE DRAWINGS

FIG. 6 is a sectional view of a portion of the holding tank top wall showing the actuated member of the tank blade valve coupling mechanism;

FIG. 7 is a cross sectional view of a vent valve in the holding tank top wall;

FIG. 8 is an exploded perspective view of the actuating member and linkage of the tank blade valve coupling mechanism;

FIGS. 9-12 are plan views of a recreational vehicle bathroom showing various locations and orientations of the universal toilet system of this invention.

DETAILED DESCRIPTION OF THE PREFERRED EMBODIMENT

Figure 1:
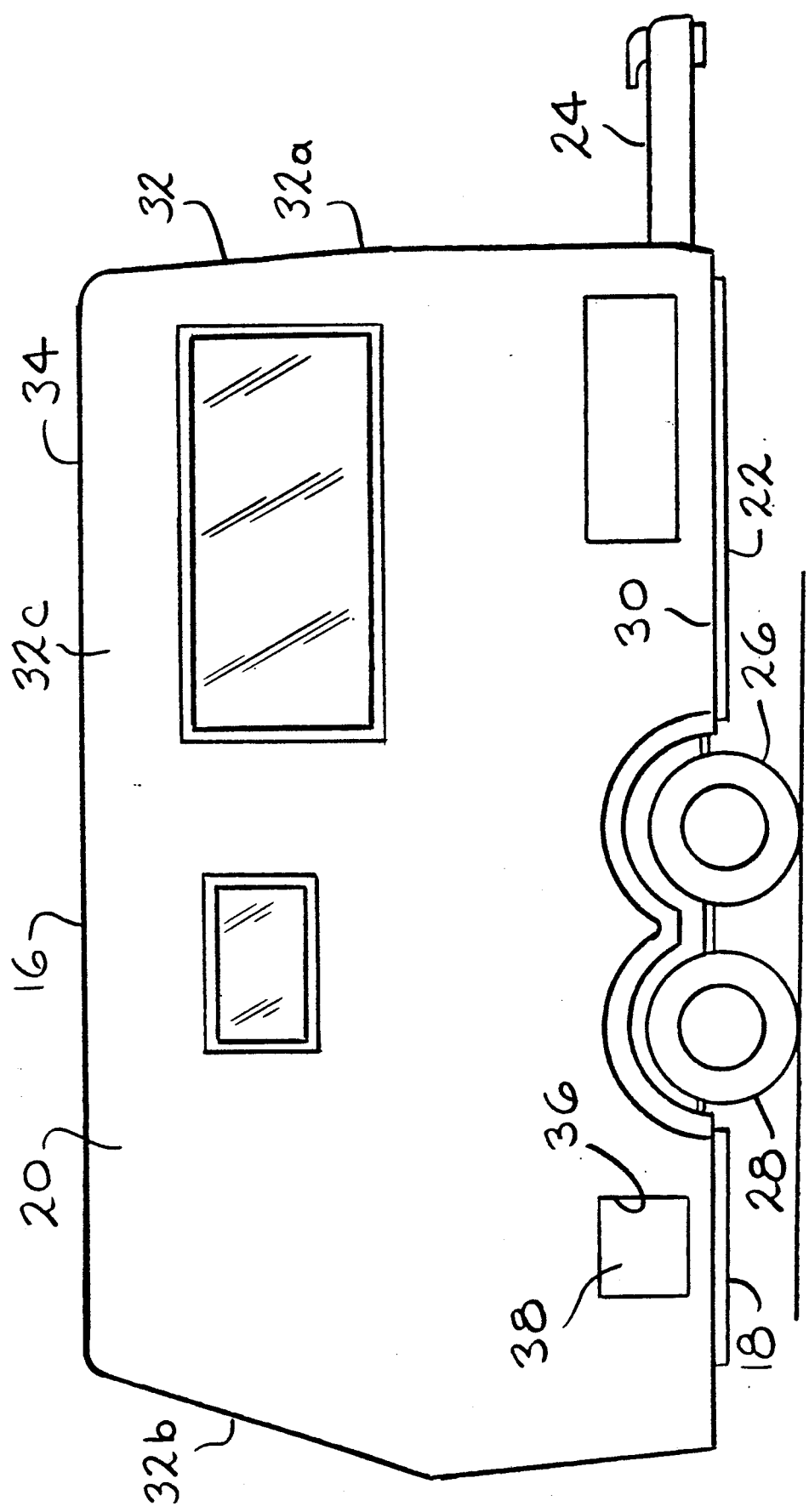
FIG. 1 is a side elevational view of a representative recreational vehicle having the universal recreational vehicle toilet system of this invention.

FIG. 1 illustrates a representative recreational vehicle (RV) 16 which embodies a universal toilet system according to this invention. RV 16 is illustrated as a travel trailer which is adapted to be pulled behind a towing vehicle (not shown). Principles of the invention are applicable to other types of RVs including without limitation, motor homes.

Recreational vehicle 16 comprises a wheeled chassis 18 on which is supported the RV body 20. Chassis 18 comprises a frame 22 having a tongue 24 at the forward end via which the trailer connects to the towing vehicle. The chassis further comprises tandem axles which are suspended from the frame 22 by a suitable suspension system and to which wheels 26 and 28 are attached.

Body 20, in general, comprises a floor 30, an upright side 32, and a roof 34 forming an enclosure. The body is shown to be generally rectangular in shape although it is to be appreciated that any given body may have departures from such a shape. Side 32 comprises four sidewalls, namely a front 32a, a rear 32b, and two lateral sidewalls 32c. It is the right hand one of these lateral sidewalls 32c which is viewed directly in FIG. 1, and it is arranged at a right angle to floor 30. Sidewall 32c is provided with a rectangular opening 36 which is shown in FIG. 1 to be closed by a door 38. This opening provides external access to the universal toilet system within the RV body.

Figure 2:
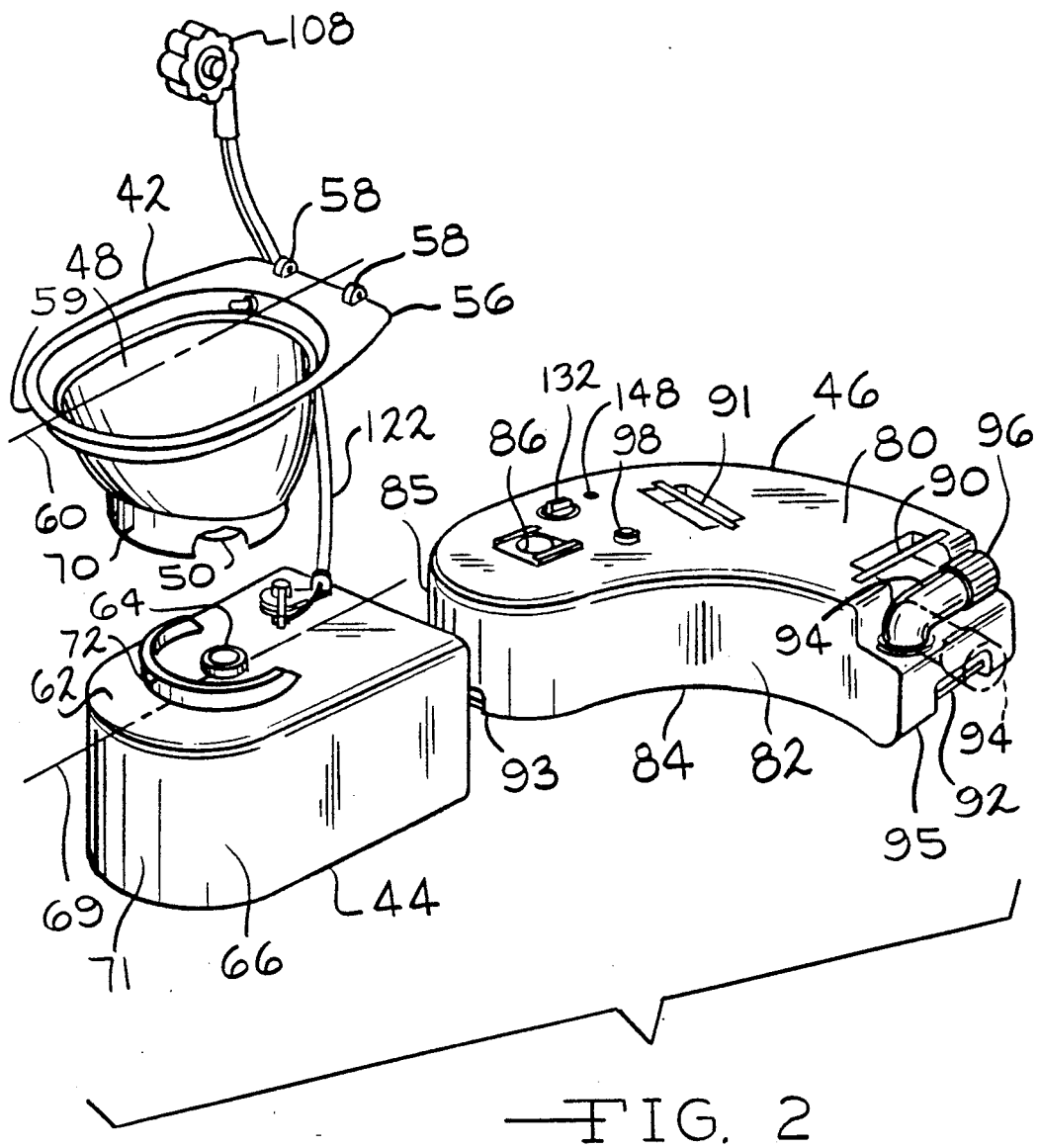
FIG. 2 is an exploded perspective view of three of the major components of the universal toilet system.
Figure 3:
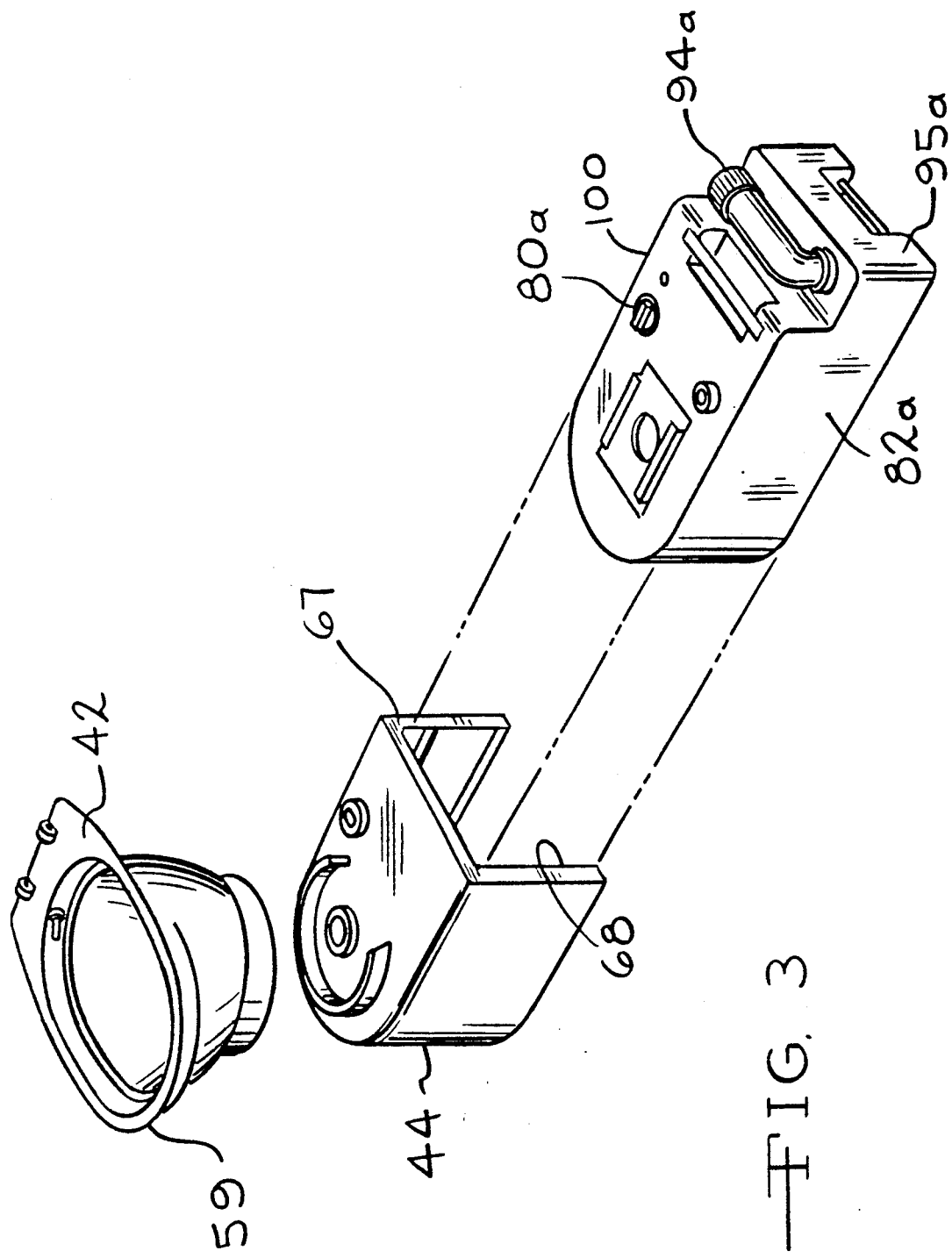
FIG. 3 is an exploded view of the major components of the universal toilet system similar to FIG. 2 with a modified version of the waste holding tank.

FIGS. 2 and 3 portray the general organization and arrangement of the major components of the universal toilet system according to this invention. The components illustrated in FIG. 2 are a bowl section 42, a base section 44, and a holding tank 46. The bowl section 42 includes a toilet bowl 48 having a bottom outlet 50 and a seat 52 and cover 54 (shown in FIG. 4) hinged to the rear 56 of the bowl via mounting bosses 58. The bowl discharge outlet is concentric about an axis 51 (shown in FIG. 4). The bowl section 42 has a front portion 59 which is spaced from the outlet and extends in a direction perpendicular to the axis 51. The bowl section has a longitudinal axis 60 extending forward from the rear 56 through the front portion 59.

The base section 44 includes a generally horizontal top wall 62 having an opening 64 therethrough. The top wall 62 is supported above the RV floor 30 by an upright sidewall 66. The sidewall 66 includes an opening 68 in the rear 67 of the base section as shown in FIG. 3. Base section 44 also has a horizontal longitudinal axis 69 which projects forward from the opening 64 to the front portion 71.

Figure 4:
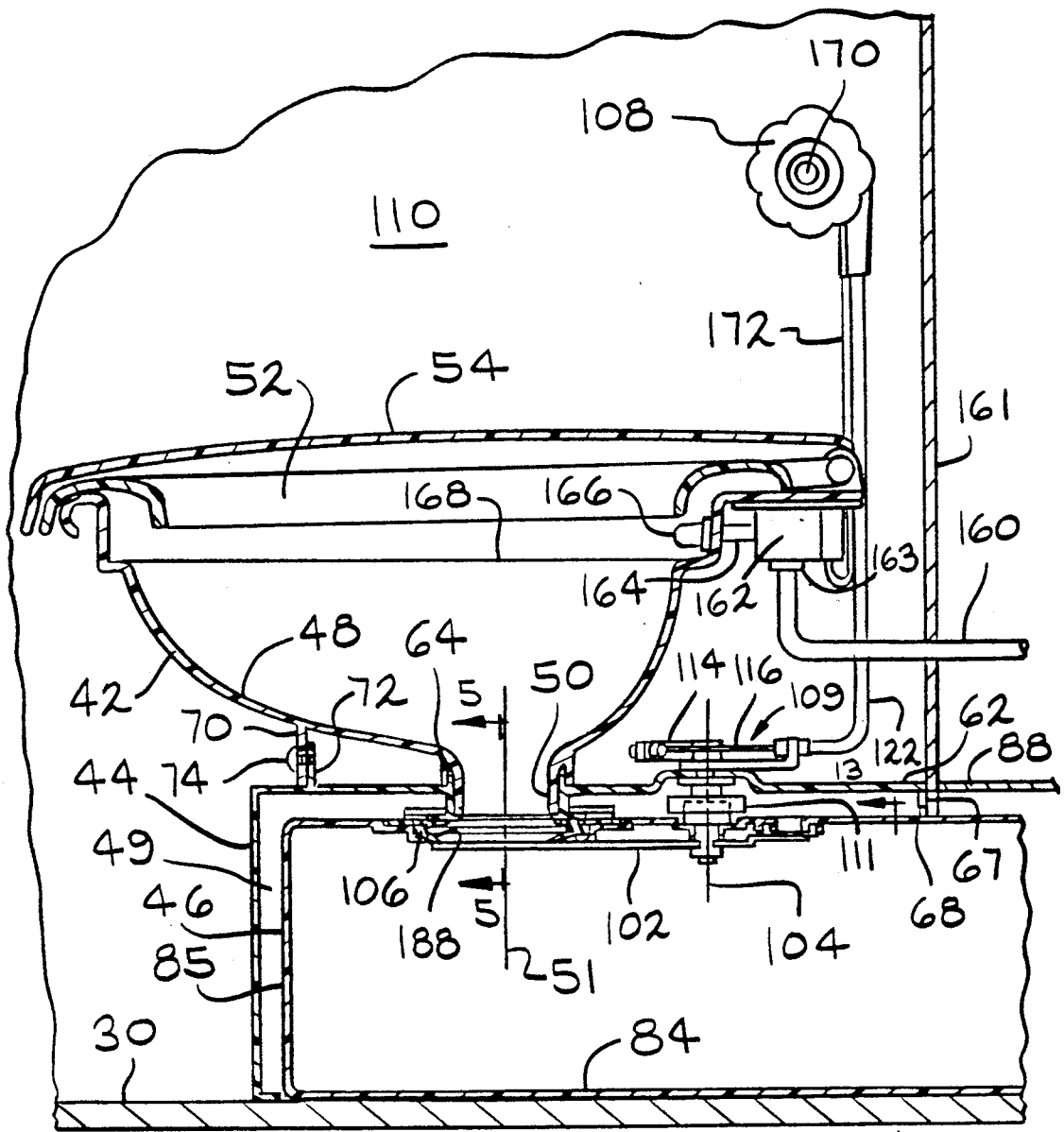
FIG. 4 is a vertical sectional view of an assembled universal toilet system installed in a recreational vehicle.

FIG. 4 is a sectional view of the assembled toilet system within the RV body 20. The base section 44 is supported upon the RV floor 30 with the bowl section 42 supported upon the top wall 62. The bottom outlet 50 of the bowl 48 projects through the opening 64 in the base top wall into the base section interior. The bowl outlet 50 and the opening 64 are concentric about the generally vertical, upright axis 51. The bowl section 42 includes a downwardly extending support skirt 70 which rests upon the top wall of the base to provide support for the bowl section. The top wall of the base section includes an upstanding flange 72 which can be attached to the skirt 70 with a screw 74 or other suitable fastening means. The skirt 70 and flange 72 are both arcuate and concentric about the axis 51.

Referring to FIG. 2, holding tank 46 has a generally overall curved shape and comprises a top wall 80, a curved sidewall 82, and a bottom wall 84. The top and bottom walls 80 and 84 respectively are generally horizontal while the sidewall 82 is upright and curved in an upright plane forming a tank which is curved along its longitudinal length. The purpose of the curved tank will be described below. The tank top wall 80 includes an inlet opening 86 adjacent one end 85 of the tank for receiving waste water from the outlet 50 of the bowl. Tank end 85 is inserted into the opening 68 in the rear 67 of the base section to a stowed position in which the tank inlet 86 is in registry with the base opening 64 and the bowl outlet 50 as shown in FIG. 4. In the stowed position a fluid passage connection is formed between the bowl and the holding tank as will be described in detail below.

The base section 44 forms a stowage compartment for the tank 46. The base section and tank can be of relative sizes such that the entire tank fits within a stowage compartment formed by the base section. Alternatively, as shown in FIG. 4, the base section and an interior wall structure, such as wall 88, cooperate to form a stowage compartment 49 upon the floor 30 to store the holding tank with only the end portion 85 of the tank inserted into the base section. The stowage compartment 49 is used to provide an enclosure for the tank within the recreational vehicle interior yet separated from the RV occupant space so as to contain any waste odors or spillage from the tank.

The stowage compartment 49 is bounded on one side by the door 38 in the RV sidewall. After the tank 46 has been filled with waste, the tank is removed from the stowage compartment through the opening 36 in the RV sidewall 32c for proper disposal of the waste. The tank can thus be removed from the RV for waste disposal without carrying the tank through the RV interior.

For ease in handling, the tank 46 is equipped with one or more handles such as handles 90 and 91 formed in the top of the tank 46 and handles 92 and 93 disposed in the ends of the tank. Handle 90 is located near the tank end 95 while handle 92 is positioned in the end 95. Tank end 95 is positioned adjacent to opening 36 in the RV sidewall, enabling the tank to be grasped by handles 90 or 92 to pull the tank horizontally out of the stowage compartment.

The waste holding tank includes a pivotal discharge pourspout 94 adjacent tank end 95 which is shown in FIG. 2 in a stowed position in solid lines overlaying the end portion of the tank. The pourspout is closed by a removable cap 96 secured to the open end of the pourspout. The pourspout is shown in an operable position in phantom lines in which the spout projects away from the tank. In this position, a filled holding tank can be emptied by turning the tank such that the pourspout is directed downward. A vent valve assembly 98 disposed in the top wall of the tank is opened to allow air to flow into the tank as the tank is emptied to enable a smooth discharge of waste liquid through the pourspout.

The holding tank 100 of FIG. 3 is constructed similarly to the holding tank 46 of FIG. 2 with the exception that the tank is generally rectangular as opposed to curved. Components of tank 100 which are similar to components of tank 46 are given the same reference numeral followed by the suffix "a".

The inlet 86 in the tank top wall is opened and closed by a blade valve 102 horizontally disposed within the interior of the tank. The blade valve 102, when the tank is in the stowed position, is disposed beneath the bowl discharge outlet and closes the bowl outlet. The blade is moved in a horizontal arcuate path about a vertical axis 104 spaced from the inlet 86. An annular seal 106 in the inlet 86 includes an inwardly and downwardly directed sealing lip 188 which contacts the top of the blade 102 to seal the inlet 86.

The blade 102 is moved between open and closed positions by an actuator 108. Actuator 108 is remotely mounted to a wall 110 within the recreational vehicle and connected to the blade valve via a coupling mechanism 109 on the base section and the tank. The coupling mechanism 109 is designed to connect and disconnect as the tank is moved to and from the fully stowed position.

A portion of coupling mechanism 109 is disposed on base section top wall 62 and another portion is disposed on the holding tank top wall 80. The portion of the coupling mechanism on the base section is shown in FIG. 8 and includes an actuating member 111. The actuating member 111 is pivotally mounted on the bottom side of the top wall 62 and is connected to a shaft 112 by a screw 113 or other suitable fastening means.

The shaft 112 extends through the base section top wall and washer 115 and includes an integrally formed lever 114 about the base section top wall at a right angle to the shaft. The shaft 112 and actuating member 111 are caused to rotate about the axis 104 by movement of a flexible cable 116 attached to the lever 114 through aperture 120 by a retaining clip 118. The cable 116 is contained within a tubular cover 122 which is secured to a mounting member 124 which in turn is secured to the top wall 62. The mounting member 124 includes an aperture 127 through which shaft 112 passes and an upturned flange 125 containing an aperture 126. Cable 116 is routed through the aperture 126 with the cable cover 122 being secured to the mounting member 124 by a C-clip 128 seated within a groove 129 in the terminal portion of the cover. The other end of the cable 116 is attached to the actuator 108 such that upon rotation of the actuator, the cable is caused to slide within the cover 122, in turn rotating lever 114 and actuating member 111.

The portion of the coupling mechanism 109 on the holding tank comprises an actuated member 132 disposed on the top wall of the holding tank and concentric with the axis 104 when the holding tank is in the stowed position. When the tank is in the stowed position, the actuating and the actuated members are operatively connected in a driving relationship whereby rotation of the actuating member about axis 104 imparts rotary motion to the actuated member about the axis 104. It is this motion which in turn operates blade 102.

Actuated member 132 is journaled within an opening 138 made in the top wall of the tank in a sealed manner and has an integral shaft portion 140 projecting into the tank. This shaft portion has a non-circular cross sectional shape and vent valve member 142 is fitted onto it by a matching hole in a central hub portion 143 of the vent valve member 142. A blade portion 145 of the vent valve member projects radially from the hub portion. Member 142 is axially kept on shaft 140 by integrally flexible catches or barbs 146 on the axial end of the shaft. The vent valve member 142 and the actuated member 132 are retained on the tank by axially capturing the tank top wall. The blade 102 has an operative coupling with the actuated member 132. This coupling is provided through a rotary lost motion connection of the blade 102 with the vent valve member 142.

A venting aperture and seal 148 is provided in the tank top wall. The venting aperture is closed by the blade portion 145 on the vent valve member 142. In operation, rotation of the actuated member 132 in the blade opening direction will impart motion to the vent valve member 142 to open the vent thereby venting the head space of the tank. After the tank head space is vented, the lost motion connection between the vent valve member and the blade 102 will cause the blade to rotate about axis 104 opening the inlet 86 in the tank top wall.

When the inlet 86 is to be closed, rotation of the actuated member 132 in the opposite direction will rotate the blade 102 to close the tank inlet and further rotate the vent valve member 142 into position closing the vent aperture 148.

The operative coupling between the actuating and actuated members is in the form of a disconnectable connection which makes and breaks in accompaniment of bodily motion of the holding tank into and out of the base section. The nature of the operative coupling between the actuating and actuated members is in the form of diametrical tongue 134 on one of the members, the actuated member in this embodiment, and a diametrical slot 136 on the other, the actuating member. When the valve has been operated to the closed position by actuator 108, the diameters of the tongue and slot lay on a line which is parallel to the direction in which the holding tank moves into and out of the stowed position. Because the ends of the slot are open, the tongue can move readily relative to the axis 104 allowing connection and disconnection of the coupling mechanism 109 to occur.

Operation of the connected coupling to a position which opens the inlet 86 will result in the diameters of the slot and tongue being moved out of parallelism with the direction of movement of the tank into and out of the base section. Consequently, if an attempt is made at this time to move the tank from the base section, the misalignment of the connection relative to the direction of tank removal will restrict the movement of the holding tank and prevent it from being removed from the base section. Thus it is required that the inlet 86 be closed before the tank is withdrawn and this can avoid potential splashing of the tank contents out of the inlet or other undesired consequences which could result from an open inlet 86.

A water line 160 is used to provide flush water to the toilet bowl to flush the bowl after use. The water line 160 passes through RV interior wall 161 and is connected to inlet 163 of an electrically actuated valve 162. Water flows from the valve 162 through outlet tube 164 to a nozzle 166 in the bowl 48. The nozzle directs the flush water circumferentially onto a ledge 168 formed integrally in the bowl 48. The water line 160 is supplied by the RV manufacturer and contains water under pressure such that when the valve 162 is opened, the water will flow through the valve and nozzle 166. A flush valve operator, consisting of a push button electrical switch 170, is disposed within the center of the blade valve actuator 108 and is connected to the flush valve 162 by an electrical wire 172. Upon operation of the switch 170, the valve 162 is opened from its normally closed position to permit flush water to flow into the bowl.

To flush the toilet after use, the actuator 108 is rotated to rotate the blade 102 to open the tank inlet 86. The switch 170 is then operated to open valve 162 allowing flush water to flow through the nozzle into the bowl to flush the contents of the bowl into the holding tank. Upon release of the switch 170, the valve 162 is closed, terminating the flow of flush water. Actuator 108 is then rotated in the opposite direction to close the tank inlet 86.

One significant feature of the universal RV toilet system is that the holding tank inlet opening 86 automatically connects to and disconnects from the toilet bowl outlet 50 in accompaniment of movement of the holding tank into and out of the base section 44. Likewise, as described above, the coupling mechanism between the actuator 108 and the blade valve 102 also automatically connects and disconnects with movement of the holding tank into and out of the stowage compartment.

Figure 5:
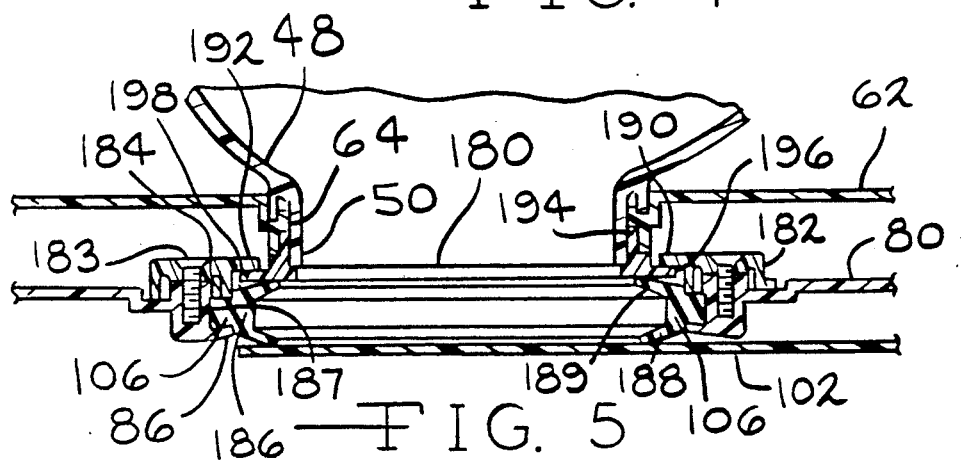
FIG. 5 is an enlarged fragmentary sectional view of the fluid coupling between the bowl and holding tank as seen from substantially the line 5—5 of FIG. 4.
Figure 13:
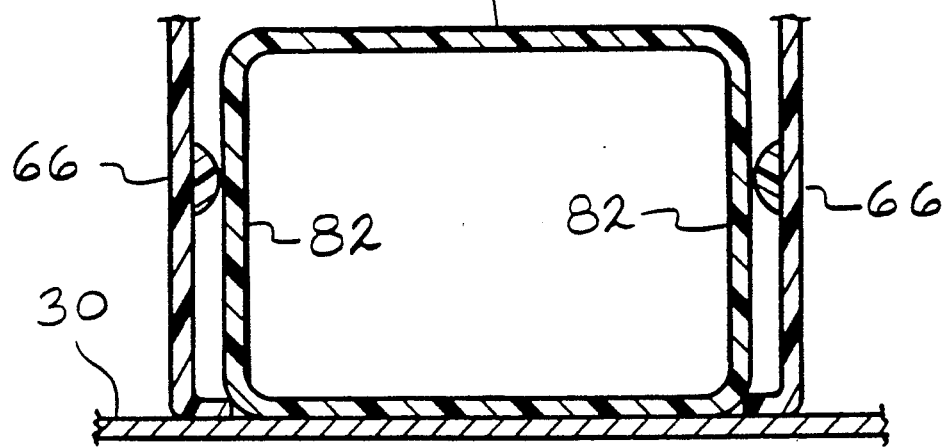
FIG. 13 is a sectional view of the tank and base section as seen from substantially the line 13—13 of FIG. 4 illustrating the sidewall of the base section guiding the tank for motion in and out of the base section.

It is important for the separable connection between the holding tank inlet opening and a toilet bowl outlet to be of a sealed nature when connected. Briefly, the holding tank is guided as it is moved into the base section by the inside surface of the sidewalls 6 of the base section engaging the sidewalls 78 of the holding tank as shown in FIG. 13. This will serve to establish fairly precise alignment of the bowl outlet and the holding tank inlet. Additional means however is associated with the bowl outlet and the holding tank inlet to take into account certain tolerance variations which inherently exist in the commercial manufacture of the product to ensure that the final connection is properly sealed. Details are shown in FIG. 5.

A flange member 180 is fitted around the opening 64 in the top wall 62 and the bowl outlet 50. Member 180 forms one part of the guide mechanism for guiding the holding tank inlet into precise final registry with the bowl outlet. The other part of the guide mechanism is formed by a member 182 which is attached to the top wall of the holding tank around inlet 86 via screws 183.

Member 182 comprises a central annular portion 184 which serves to retain the annular elastomeric seal 106 on the tank around inlet 86. Specifically, seal 106 comprises a main body 186 which is disposed in a circular cavity 187 around the circular inlet 86. A pair of annular lips 188 and 189 project from main body 186. The annular retention portion 184 fits onto the top of the holding tank around cavity 187 and compresses the annular body of the elastomeric seal downwardly into the cavity to provide a seal of the elastomeric body to the holding tank around inlet 86. Member 182 further comprises channels 190, 192 formed along its longitudinal side edges parallel with the direction of movement of the holding tank into and out of the base section.

Flange member 180 comprises an annular portion 194, which fits around the bowl outlet projecting through the top wall 62, and side edge portions 196, 198 which, like channels 190, 192, are parallel with the direction of motion of the holding tank into and out of the base section.

The two members 180, 182 are so disposed around the bowl outlet and the holding tank inlet respectively so that the side edge portions 196, 198 slide into and out of the side edge channels 190, 192 as the tank is moved into and out of the base section. The flange member 180, a symmetrical ring, is fixed to the opening 64 in the top wall 62 with the bowl outlet inserted into the member 180. This enables the RV manufacturer to install the bowl section at any radial position relative to the base section while the side edge channels 190, 192 are fixed in position parallel to the direction of movement of the tank to and from the stowed position.

The sealing lip 189 is canted upwardly toward the bowl outlet. In relaxed condition, the free edge of this lip projects above the nominal level of the flat horizontal lower surface of flange member 180. The relative position of the free edge of this lip is such that when members 180, 182 are fully engaged to place the tank inlet 86 in vertical alignment with the bowl outlet opening 50, lip 189 is deflected slightly downwardly from its free position to thereby exert an upward sealing force around and against that portion of flange member 180 which fits around the bowl outlet.

The second lip 188, below the level of the first lip 189, is canted downwardly toward the holding tank and has a cooperative association with the blade 102 which opens and closes inlet 86 so that when the blade is closed, the second sealing lip 188 is deflected slightly upwardly to provide annular sealing contact with the blade around inlet 86.

Details of the vent valve assembly 98 are illustrated in FIG. 7. The valve assembly comprises a main body or fitting 202 which is inserted within an opening in a tank top wall. Fitting 202 is fashioned with an integral circular boss 204, the lower portion of which projects into the interior of the holding tank. The boss has a top wall 206 with a recess 208 formed centrally therein. Recess 208, at the bottom, comprises a circular opening 210 concentric with the boss. Four arcuate vent openings 212 are in wall 206 extending around recess 208 on a common circle. Openings 212 provide, via the interior bore of boss 204, venting of the tank interior to atmosphere.

A valving element 214 comprises a bifurcated shank 216 which fits closely within hole 210. A circular actuator button 218 is at the top of the shank 216 and a helical spring 220 is disposed around the shank and between the bottom wall of the recess and the actuator button. The spring biases the valving element 214 in the upward direction so as to urge a suitable closure portion 222 against the lower circular edge of the boss 204, so as to close the interior bore of the boss and hence, the vent openings 212. The illustrated construction of the closure portion comprises a rigid circular portion 224 which is affixed to the lower end of shank 216 within the holding tank which supports a annular gasket 226 which seals against the lower circular edge of the boss 204 when the valve is closed.

The broken line position shown in FIG. 7 thus represents the closed position to which the valve element is normally spring biased. In this position, the closure portion prevents waste materials and vapors from passing through the vent openings. The solid line position illustrates the actuated position which is used during dumping to vent the interior head space of the holding tank. A stop 228 is provided on button 218 for limiting downward displacement so that the button does not close off the vent openings when the valve is depressed. Thus, actuation of the valve assembly 201 always allows air to pass through the openings into the holding tank to prevent the creation of a partial vacuum which might give rise to belching and burping during dumping.

From the above description of the components of the universal RV toilet system, it can be seen that the toilet is useful for placement within a variety of locations and orientations within a recreational vehicle. The base section is fixed to the floor of the recreational vehicle in a location which permits a holding tank to be slid into and out of the base through the sidewall of the recreational vehicle. The bowl section can be mounted on top of the base section in a number of different positions relative to the base section so that the RV manufacturer can choose the orientation of the toilet bowl. The blade valve actuator and flush valve switch are remotely connected to the toilet system through a flexible cable and electrical wire enabling the control to be remotely mounted to a wall or other structure in the recreational vehicle bathroom, without regard to the orientation of the bowl section relative to the base section.

FIGS. 9 through 12 illustrate the flexibility of the universal recreational vehicle toilet system according to this invention by showing a variety of toilet locations within a recreational vehicle.

Within the RV body 20, a bathroom 301 is formed by interior vertical walls 302, 304 and 306 along with RV sidewall 32c. Entry is gained into the bathroom 301 through a door 308 from the interior of the RV body. In FIGS. 9 through 12, like components are indicated by the same reference numeral followed by a suffix a-d. The toilet system components are given the same reference numeral in FIGS. 9-12 because these components are identical, only the orientation of the bowl section relative to the base section varies in these figures.

In FIG. 9, the base section 44 of the universal toilet system is disposed adjacent the interior wall 306a with the longitudinal axis 69 of the base section extending generally parallel to the wall 306. A horizontal panel 310a forms a continuation of the base section top wall 62 and extends from the rear side 67 of the base section to the RV sidewall 36c. The panel 310a along with the base section top wall forms the top of the stowage compartment for the waste holding tank within the recreational vehicle interior.

The holding tank is inserted into and removed from the stowage compartment through the opening 36 in the sidewall 32c which is shown closed by the door 38. When the holding tank is inserted into the stowage compartment, the holding tank inlet 86 and the toilet bowl outlet 50 are horizontally aligned in vertical registry with on another forming the sealed fluid coupling as previously described. The bowl section 42 is mounted to the top of the base section 44 with the front portion 59 extending radially at a right angle 314a relative to the base section. The actuator 108 and switch 170 are shown mounted to the wall 306a.

In FIG. 10, the toilet is located in the corner formed by the interior walls 304b and 306b. Panel 310b, which forms a portion of the top of the stowage compartment, has been increased in length to extend from the RV sidewall 32c to the rear 67 of the base section 44. In FIG. 10, the bowl section 42 has been mounted upon the base section 44 with the front portion 59 extending radially at an obtuse angle 314b relative to base section, illustrating another orientation of the bowl and base sections relative to each other. In the toilet systems shown in FIGS. 10 and 9, the holding has been a rectangular tank such as tank 100 shown in FIG. 3.

In FIG. 11, the base section 44 is placed in the bathroom with the rear 67 abutting the interior wall 306c of the RV. The toilet system is located in a position such that the wheel 318, which is separated from the vehicle interior by a wheel well 320, is located laterally between the toilet system and the RV sidewall 32c. Because of this obstruction, it is not possible for the holding tank to pass laterally from the toilet to the RV sidewall as shown in FIGS. 9 and 10. A curved holding tank such, as the tank shown in FIG. 2, is used in this application and extends behind the toilet and around the wheel to sidewall 32c. The stowage compartment beneath panel 310c likewise extends around the wheel well 320 and to the sidewall 32c. The stowage compartment can be located underneath a bench or in a closet in the recreational vehicle so that its does not intrude into the occupant living space. The bowl section 42 is mounted to the base section 44 with the front portion 59 extending radially at an acute angle 314c relative to the base.

Figure 12:
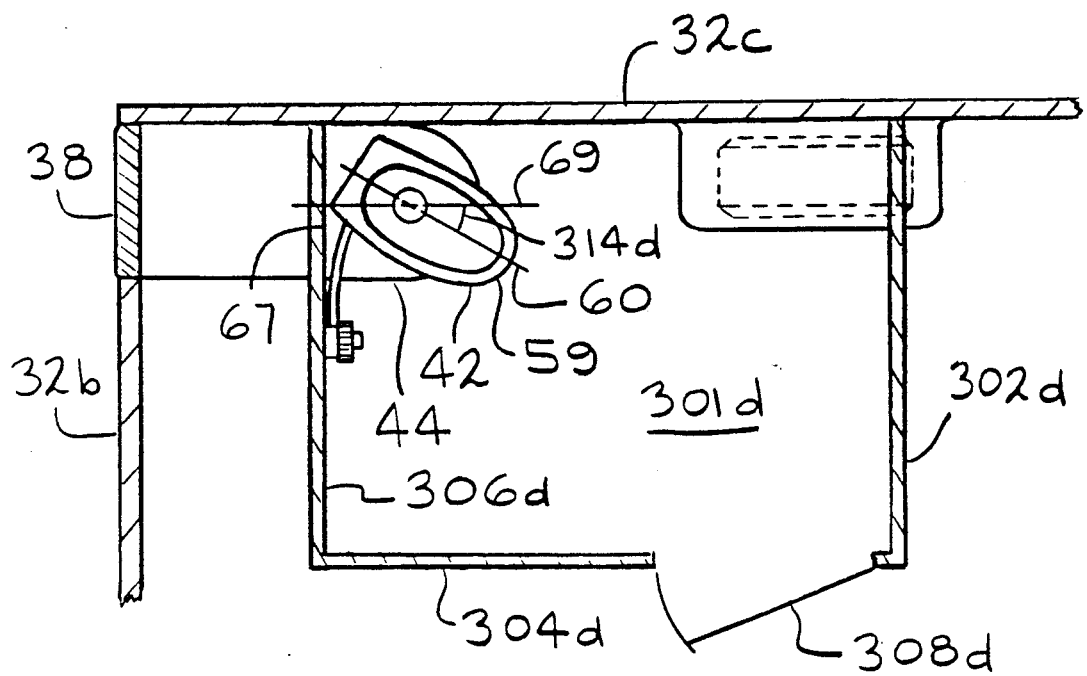

Referring now to FIG. 12, the universal toilet system is located in the corner of the bathroom formed by the interior wall 306d and the RV sidewall 32c. The rear 67 of the base section 44 is abutting the interior wall 306d such that a holding tank is inserted through the rear wall 32b of the RV and through the interior wall 306d as opposed to being inserted laterally through the sidewall 32c. The bowl section 42 is again mounted to the base section 44 with the front portion 59 extending radially at an acute angle 314d relative to one another.

From the above examples, it can be seen that the universal RV toilet system of the present invention can be used in a variety of positions and orientations within a recreational vehicle. The same base section 44 and the bowl section 42 are used in all of the examples shown in FIGS. 9-12 with the only difference between installations being the orientation of the bowl section relative to the seat section.

The bowl and base sections are configured so as to enable the bowl section to be mounted on the base section with the front portion of the bowl section extending radially relative to the base section in any direction within a range of radial directions. This range of directions could be a 360° range in which the bowl front portion could extend in any direction relative to the base. As a practical matter, however, this range will generally be less than 360°. Due to the raised height of the tank stowage compartment above the RV floor, it is not practical to position the bowl front portion extending over the stowage compartment. As a practical matter, approximately a 270° range of radial directions will be adequate to provide the vehicle manufacture maximum flexibility in the placement of the toilet system within an RV.

The flush control, comprising an actuator for the tank blade valve and an operator for the flush water valve, is remotely mounted from the bowl and base sections to enable the RV manufacturer to place these controls where desired, regardless of the orientation of the bowl section relative to the base section. As a result, the universal toilet system enables the RV manufacturer to stock only one toilet system for use in a variety of RV models. Thus the inventory requirements and the toilet complexity are greatly reduced for the manufacturer. Accordingly, the objectives of the present invention of reducing the number of toilet systems needed by the manufacturer and increasing the manufacturer's flexibility in interior design of the vehicle have been achieved.

It is to be understood that the invention is not limited to the exact construction illustrate and described above, but that various changes and modifications may be made without departing from the spirit and scope of the invention as defined in the following claims.

What is claimed is:

1. A sanitary toilet system adapted for use in a recreational vehicle having a body including a generally upright outer wall having an opening therethrough, said toilet system comprising:
   a base section adapted to be supported on said body and having a top wall with an opening therethrough;
   a bowl section mounted on said base section and having a toilet bowl with a bottom discharge outlet, said discharge outlet being substantially concentric about an upright axis extending through said top wall opening, and, said bowl section also having a front portion extending radially from said axis;
   a waste holding tank adapted to have a stowed position within said body in which at least a portion of said tank is disposed beneath said base section top wall with said base section at least partially enclosing said tank, means for supporting and guiding said tank for horizontal motion into and out of said body through said opening in said outer wall and means forming a disconnectable sealed coupling operable to provide a fluid passage connection between said bowl outlet and said tank when said tank is in said stowed position whereby said tank receives waste from said bowl; and said base section and said bowl section including coacting means thereon enabling said bowl section to be mounted to said base section with the front portion of said bowl section extending in a radial direction relative to said base section within a predetermined range of radial directions to thereby adapt the installed location of said toilet system in said recreational vehicle to a desired position.

2. The toilet system of claim 1 wherein said disconnectable sealed coupling means is operable to provide automatic sealed connection of said fluid passage connection upon movement of said tank to said stowed position and automatic disconnection of said fluid passage connection upon movement of said tank away from said stowed position.

3. The toilet system of claim 1 further comprising an inlet in said tank through which waste water from said bowl passes into said tank, a tank inlet valve disposed within said tank for closing and opening said tank inlet, means for actuating said inlet valve to open and close said inlet, said actuating means including an actuator adapted to be mounted in a variety of positions in said recreational vehicle remote from said base section, bowl section and tank and operatively connected with said tank inlet valve through a second coupling means on said top wall and said tank.

4. The toilet system of claim 3 wherein said second coupling means includes a disconnectable connection that automatically connects upon movement of said tank over a final portion of travel of said tank as said tank is moved to said stowed position and automatically disconnects upon movement of said tank over an initial portion of travel of said tank as said tank is moved from the stowed position.

5. The toilet system of claim 1 wherein said holding tank has an inlet through which waste water from said bowl outlet passes into said tank, said bowl outlet and said inlet being disposed in a horizontal alignment so that said inlet is brought into registry with said outlet when said tank is in the stowed position.

6. The toilet system of claim 5 including guide means on said base section top wall at said bowl discharge outlet and on said holding tank at said inlet acting as said holding tank is being moved over a final portion of travel to said stowed stowed position to secure a precise relationship in the registry of said inlet and said outlet when the holding tank is in the stowed position.

7. The toilet system of claim 6 in which said guide means comprises a first guide portion on said base section top wall and a second guide portion on said holding tank at said inlet, said guide portions coacting to secure said precise relationship in the registry of said inlet and said outlet when the holding tank is in the stowed position.

8. The toilet system of claim 1 further comprising means for flushing waste from said bowl through said bowl outlet with water, said flushing means including a flush valve mounted to said bowl section having an inlet configured to be connected to a water supply within said body and an outlet in fluid communication with said bowl, an operator for said flush valve adapted to be remotely mounted in said body from said bowl section and said base section and means for operatively connecting said operator to said flush valve.

9. The toilet system of claim 1 further comprising an inlet in said tank through which waste water from said bowl passes into said tank, an inlet valve disposed within said tank for closing and opening said tank inlet;
means for flushing waste from said bowl, said flushing means including a flush valve having an inlet adapted to be connected to a water supply within said body and an outlet in fluid communication with said bowl; and
a control for said inlet valve and said flush valve adapted to be remotely mounted in said body from said bowl and base sections, said control including an operator for said flush valve, an actuator for said inlet valve and means connecting said operator and actuator to said flush valve and inlet valve respectively.

10. The toilet system of claim 9 wherein said actuator is connected to said coupling means by a flexible cable slidable within a fixed cover.

11. The toilet system of claim 9 wherein said flush valve is electrically operated and said operator is an electrical switch connected to the flush valve via an electrical wire.

12. A sanitary toilet adapted for use in a recreational vehicle having a body comprising:
a toilet bowl having a bottom discharge outlet through which waste is removed from said bowl;
an outlet valve disposed beneath said outlet for opening and closing said outlet;
means for flushing said bowl with water, said flushing means including a flush water discharge valve mounted to said bowl in communication with a water source;
a control for said outlet valve and said flush valve adapted to be mounted in a variety of positions in said body remote from said bowl; and
means operatively connecting said control to said outlet valve and said flush water valve;
said control including an actuator for said outlet valve and an operator for said flush valve.

13. The toilet of claim 12 wherein said flush valve is electrically operated and said operator is an electrical switch connected to the flush valve via an electrical wire.

14. The toilet of claim 12 wherein said outlet valve actuator is connected to said outlet valve via a flexible push-pull cable.

* * * * *